(12) United States Patent
Shimada et al.

(10) Patent No.: US 7,237,976 B2
(45) Date of Patent: Jul. 3, 2007

(54) KEY-ENGAGING PART STRUCTURE

(75) Inventors: Masahiro Shimada, Aichi (JP); Akira Yamamoto, Aichi (JP); Takao Shigemi, Aichi (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 26 days.

(21) Appl. No.: 10/115,428

(22) Filed: Apr. 4, 2002

(65) Prior Publication Data

US 2002/0150422 A1     Oct. 17, 2002

(30) Foreign Application Priority Data

Apr. 4, 2001  (JP) ............................. 2001-105936
Apr. 17, 2001 (JP) ............................. 2001-118436

(51) Int. Cl.
    *F16D 1/06*        (2006.01)
(52) U.S. Cl. .............................. 403/1; 403/11; 403/16; 403/318; 403/319
(58) Field of Classification Search .............. 403/1, 403/11, 16, 315, 316, 318, 319, 324, 378, 403/379.1–379.5, 109.5, 109.6, DIG. 7
    See application file for complete search history.

(56) References Cited

U.S. PATENT DOCUMENTS 3,832,916 A * 9/1974 Schoeps .................... 81/464
3,905,710 A * 9/1975 Cain et al. ................. 403/356
4,547,101 A * 10/1985 Dowdakin
4,732,059 A * 3/1988 Bonner

FOREIGN PATENT DOCUMENTS

JP     48-43306     12/1973
JP     2-66723      5/1990

OTHER PUBLICATIONS

"Jigs and Fixtures: non standard clamping," Hiram E. Grant, McGraw-Hill, New York, 1967.

* cited by examiner

*Primary Examiner*—Daniel P. Stodola
*Assistant Examiner*—Victor MacArthur
(74) *Attorney, Agent, or Firm*—Squire, Sanders & Dempsey L.L.P.

(57) ABSTRACT

A key-engaging part structure which realizes an efficient formation of a key-engaging part in an axial-hole member is provided. A key-engaging through hole is formed in a key-engaging part of an axial-hole member while both and portions of the axial-hole member leave intact such that the key-engaging through hole is bored through the axial-hole member in the radial direction. The key-engaging part is formed using this through hole.

3 Claims, 8 Drawing Sheets

KEY-ENGAGING PART STRUCTURE

BACKGROUND OF THE INVENTION.

1. Field of the Invention

The present invention relates to a method of forming a key-engaging part of an axial-hole member and a key-engaging part structure to be used in industrial devices, transport devices, and so on.

2. Description of the Related Art

Conventionally, it is well known in the art that there is a method for allowing a power transmission between a shaft and an axial-hole member. Such a conventional method comprises the steps of: forming a key way in the axial-hole member having the shaft and an axial hole in which the shaft can be.-fit; and engaging a key with the key way to make a connection between the shaft and the axial-hole member.

In the case of the axial hole being bored in the axial-hole member in the axial direction, the key way can be formed in the axial-hole member by inserting a cutting tool such as a broach from the one end of the axial hole to the other end thereof in the axial direction.

On the other hand, in the case of a non-penetrated axial hole having one closed end in the axial direction, a broach or the like cannot be inserted through the axial hole. In the prior art, therefore, a key way is formed in the axial-hole member using a slotter.

As shown in FIG. 14, the slotter is a machine tool for making a key way 204 by the steps of contacting a bite (i.e., a cutting tool) 202 with the inner peripheral side of an axial hole 200 and reciprocally moving the cutting tool 202 in the axial direction, while gradually moving the cutting tool 202 outward in the radial direction.

However, the key way processing using such a slotter requires to move the bite 202 back and forth many times in the axial direction in order to finish a key way 204, resulting in problems where the machining of key way is inefficient and a machining cost is high.

SUMMARY OF THE INVENTION

Therefore, the present invention has been completed in the view of these problems. It, is an object of the present invention to provide a method for forming a key-engaging part of an axial-hole member and a key-engaging part structure, by which a key-engaging part can be effectively formed and realized even if the axial-hole member has an axial hole with a closed end.

The present invention solves the above problems by providing a method for forming a key-engaging part of an axial-hole member having an axial hole to be fit to a shaft, where the key-engaging part is to be connected to the shaft in a power transmittable manner via a key to be engaged with the key-engaging part formed on an inner peripheral portion of the axial hole, comprising steps of: forming a through hole formed in the axial-hole member such that the through hole extends from an outer peripheral portion of the axial-hole member to the axial hole, leaving both axial end portions of the axial-hole member intact; and forming the key-engaging part using the through hole.

In other words, the present invention solves the above problem by an idea that a through-hole useful for the formation of a key-engaging part is formed in an axial-hole member while leaving both axial end portions intact.

According to the present invention, the usage of the through hole is not limited to a specific one. Such a through hole can be used in various ways conceivable. For example, the through-hole itself may be directly used for the formation of the key-engaging part. Alternatively, for example, the key-engaging part may be independently formed at a position symmetrical with the through hole in the radial direction.

Anyway, even if the axial-hole member has a closed end, the through hole its-elf used for forming the key-engaging part of the present invention can be easily formed by feeding a cutting tool from the outer peripheral portion to the axial hole.

For instance, the key-engaging through hole can be efficiently formed by feeding an end mill from the outer peripheral portion of the axial-hole member to the inside thereof in the radial direction and then feeding the end mill in the axial direction.

The key-engaging through hole has closed opposite ends in the axial direction while being bored through the axial-hole member from the outer peripheral portion to the inner peripheral portion in the radial direction. Therefore, even if a rotary power acts on the axial-hole member, it is hard to propagate along the circumferential direction.

Therefore, for example, the key-engaging through hole can be directly used for the key-engagement. In this case, a large rotary power can be transmitted as much as or more than that of the conventional key way in which the outer radial end thereof is being closed.

Furthermore, for example, if the key-engaging part such as the key way is independently formed using the above through hole, the key-engaging part can be easily formed without the usage of a broach or a slotter. Therefore, the machining cost can be reduced significantly even though depreciation expense is a problem as well as a little production amount.

As a modified embodiment of the present invention, the key-engaging part structure may be constructed such that a recess portion is formed in the outer peripheral portion of the axial-hole member 10 and a key-engaging through hole is formed between the bottom of the recess portion and the axial hole.

Therefore, such a recess portion can be used for housing a lid for covering the through hole if required.

Furthermore, if the through hole is directly used as a key-engaging part, the following advantages can be obtained.

That is, the side portion of the key-engaging part to be contacted with the key is generally subjected to a finish.

On the other hand, when the key-engaging through hole is comparatively deep in the radial direction, the through hole is allowed to touch the key only at a position near the axial hole, and it does not touch on the key at a position near the outer peripheral portion.

Thus, the recess portion may be roughly formed in the outer peripheral portion in the axial-hole member and the key-engaging through hole which requires the finish may be then formed between the bottom of the recess portion and the axial hole. In this case, therefore, the area which should be subjected to a finish process can be minimized, so that the work efficiency of the key-engaging part can be significantly increased, while the machining cost can be significantly reduced.

Furthermore, as a modified embodiment of the present invention, an insertion groove may be formed in one end portion of the inner peripheral portion of the axial hole in the axial direction to allow the insertion of the key in the axial direction.

For coupling the shaft with the axial-hole member by way of the key, the key may be engaged in a key way of the shaft in advance.

In this invention, the key-engaging through hole has closed opposite ends in the axial direction. However, the formation of such an insertion groove allows the coupling between the shaft and the axial-hole member after previously engaging the key with the shaft.

Furthermore, the insertion groove may be formed such that the key is allowed to extend in the axial direction and the key being inserted is also allowed to approach or to come into contact with the insertion groove. Therefore, the insertion groove can be used as a stopper for preventing the key from falling off outward in the radial direction.

In addition, a stopper for limiting the outward movement of the key in the radial direction may be additionally provided.

Therefore, the key can be surely prevented from falling off outward in the radial direction.

Furthermore, the stopper may be in the shape of a flexible snap ring. Therefore, the stopper can be fit to the outer peripheral portion of the axial-hole member by means of a radial constricting force of the stopper itself and the stopper can be allowed to approach or touch the key.

Such a stopper in the shape of a snap ring is of a simple structure, so that the key can be prevented from falling off at low cost.

Furthermore, a circumferential groove in which the stopper can be fit may be formed in the outer peripheral portion of the axial-hole member.

Therefore, the axial movement and inclination of the stopper in a snap ring shape is restricted by the groove, so that the stopper will be hardly slipped off by vibration or the like. The stopper can be prevented from falling off with a high degree of reliability.

Furthermore, the stopper may be provided as a generally E-shaped snap ring. In this case, a protrusion may be inwardly extended from the middle of the stopper in the radial direction. The protrusion may come into contact with the key in the through-hole for the key engagement when the stopper is fit to the outer peripheral portion of the axial-hole member.

Using such a stopper in the shape of a E-shaped snap ring allow the protrusion of the stopper to directly approach or touch the key even if the key is buried in the key-engaging through hole.

In other words, the key and the stopper are allowed to contact or approach to each other without extending the key in the radial direction or without placing an additional spacer or the like between the key and the stopper, resulting in the reduction in costs.

On the other hand, if a key-engaging part is independently formed using the through hole of the present invention, the key-engaging part may be formed opposite to the through hole at a symmetric position in the radial direction.

Conversely, the through hole is formed opposite to the key-engaging part at a symmetric position in the radial direction. Therefore, the key way (key-engaging part) can be formed easily and efficiently by inserting a cutting tool into through hole and feeding it in the axial direction even though the axial-hole member has an axial hole having a closed end in the axial direction.

In this case, the step of forming the through hole and the step of forming the key-engaging part using the through hole may be concurrently performed. That is, a cutting tool is passed through the axial-hole member from the outer peripheral portion of the axial-hole member to the axial hole and the cutting tool is subsequently introduced to the position symmetrical with the through hole in the radial direction, followed by feeding the cutting tool in the axial direction.

By executing these steps at the same time, the key-engaging part of the axial-hole member can be performed more efficiently.

BRIEF DESCRIPTION OF THE DRAWINGS

These and other objects and advantages of the present invention will become clear from the following description with reference to the accompanying drawings, wherein.

DETAILED DESCRIPTION OF PREFERRED EMBODIMENTS

Hereinafter, preferred embodiments of the present invention will be described with reference to the attached drawings.

Figure 1:
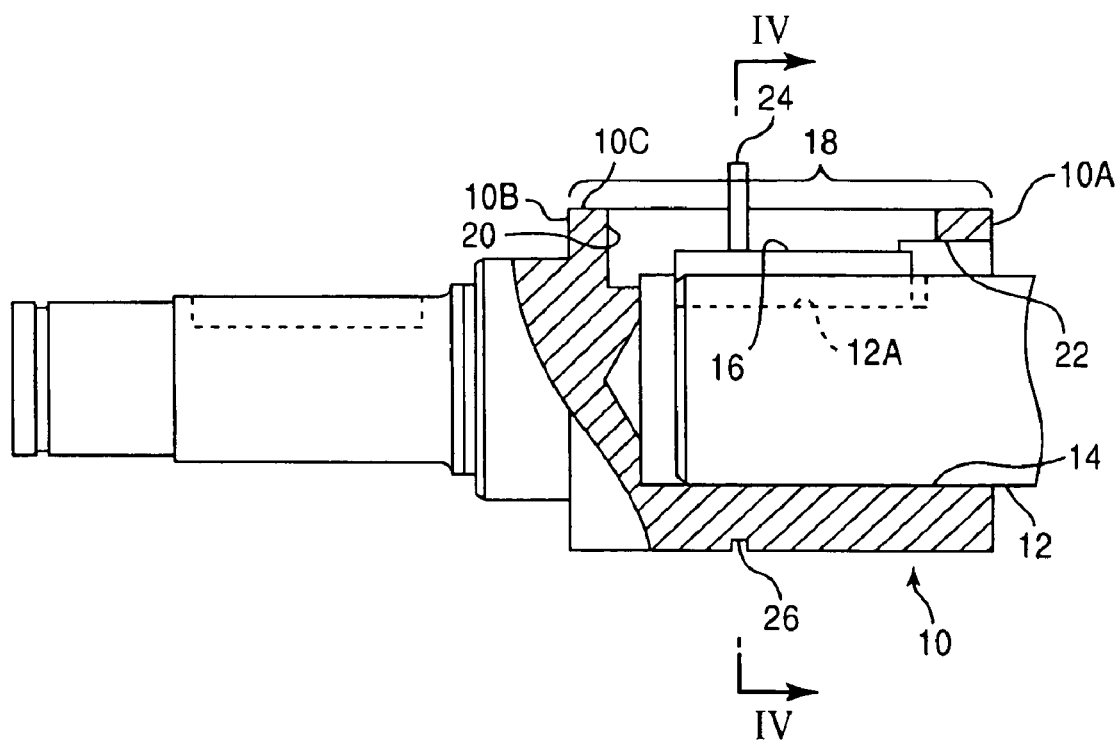
FIG. 1 is a cross sectional view of a key-engaging part structure of an axial-hole member in accordance with a first preferred embodiment of the present invention.
Figure 2:
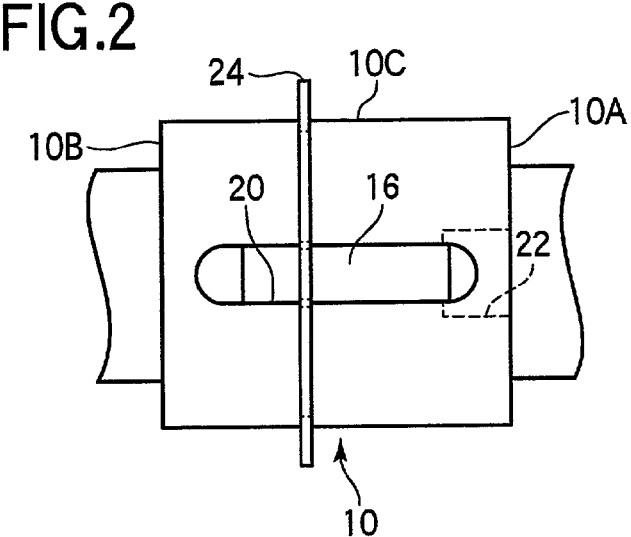
FIG. 2 is a plan view of the same key-engaging part structure as in FIG. 1.
Figure 3:
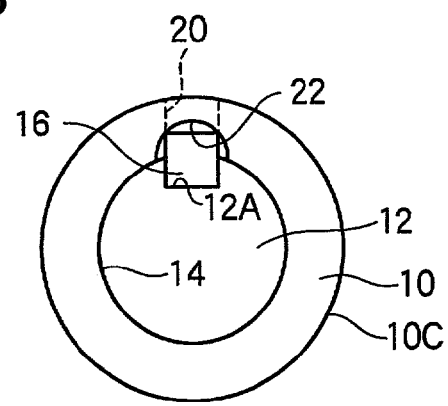
FIG. 3 is a side view of the same key-engaging part structure as in FIG. 1.
Figure 4:
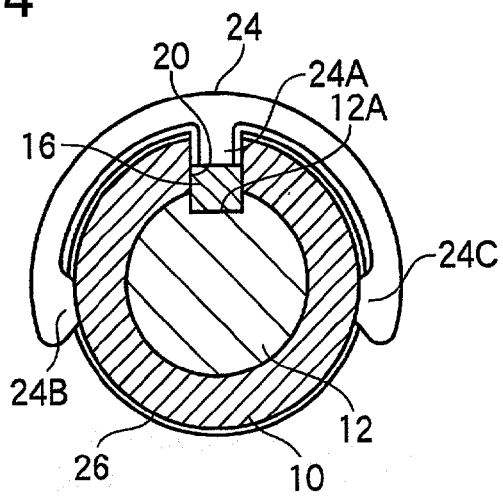
FIG. 4 is a cross sectional view taken along the line IV-IV of FIG. 1.

Here, FIG. 1 is a partial cross sectional side view along an axis of a main part of an axial-hole member according to an embodiment of the present invention, where a key-engaging part structure 18 is illustrated. FIG. 2 is a plan view of the key-engaging part structure 18 of the axial-hole member 10 viewed from above. FIG. 3 is a side view of the key-engaging part structure 18 of the axial-hole member 10 viewed from the right side of FIG. 1. FIG. 4 is a cross sectional view taken along the line IV-IV in FIG. 1.

The axial-hole member 10 has an axial hole 14 to be fit with a shaft 12. The axial-hole member 10 is connected to the shaft 12 through the key-engaging part 18 formed in the axial hole 14 and also through a key 16. Thus, a power transmission can be attained between the axial-hole member 10 and the shaft 12.

A through hole 20 for engaging the key 16 is bored through a part of the wall of the axial-hole member 10. That is, the through hole 20 extends from an inner peripheral portion (i.e., the inside of the axial hole 14) to an outer peripheral portion 10C of the axial-hole member 10 in the radial direction. Also, the through hole 20 extends along the axial direction, while both end portions 10A and 10B of the axial-hole member 10 remain intact (i.e., the hole is opened in the radial direction and is closed in the axial direction). Therefore, the key-engaging part 18 can be formed by directly engaging the key 16 in the through hole 20.

On the other hand, the shaft 12 has a key way 12A just as in the case with the conventional one.

The axial hole 14 has an open end provided as an entrance for the shaft 12 and a closed end provided as an output shaft in the axial direction.

The inner peripheral portion of the end portion 10A has an insertion groove 22 shaped like an arc in radial cross section, which extends in the axial direction so that the key 16 can be inserted through the axial hole 14 along the insertion groove 22.

Furthermore, there is provided a stopper 24 on the outer peripheral portion 10C of the axial-hole member 10. The stopper 24 is able to restrict the movement of the key 16 outward in the radial direction.

In this embodiment, the stopper 24 is provided as a flexible snap ring capable of exerting a constricting force in the radial direction. Thus, it can be fit to the outer peripheral portion 10C of the axial-hole member 10 by means of its constricting force, while making contact with the key 16.

More specifically, the stopper 24 is provided as a generally E-shaped snap ring. In this case, a protrusion 24A is inwardly extended from the middle of the stopper 24 in the radial direction. The protrusion 24A comes into contact with the key 16 in the through-hole 20 for the key engagement when it is fit to the outer peripheral portion 10C of the axial-hole member 10.

On the other hand, a circumferential groove 26 for engaging the stopper 24 is formed around the outer peripheral portion 10C of the axial-hole member 10.

The width of such a groove 26 is slightly larger than the thickness of the stopper 24, so that the stopper 24 can be engaged in the circumferential groove 26.

Furthermore, the stopper 24 has two protrusions 24B, 24C inwardly extending in the radial direction from the opposite ends of the stopper 24, which can be also engaged in the circumferential groove 26.

Here, the action of such a key-engaging part structure of the axial-hole member will be described.

At first, the method for forming the through hole 20 to be used for the engagement of the key will be described.

The through hole 20 for the engagement of the key can be formed by the following method. The method includes steps of passing a cutting tool into the axial-hole member 10 from the outside to the inside in the radial direction, while both end portions 10A, 10B of the axial-hole member 10 in the axial direction remain intact; and axially feeding the cutting tool being passed into the axial-hole member 10.

For example, an end mill is passed into the axial-hole member 10 from the outer peripheral portion 10C until the end mill reaches the axial hole 14. Then, the end mill is fed in the axial direction. Thus, the through hole 20 for the engagement of the key can be easily and quickly formed.

Accordingly, the work efficiency of the fabrication of the key-engaging part (through hole 20 for the engagement of the key) can be significantly increased, compared with the conventional method for forming the key way using the slotter.

Furthermore, an insertion groove 22 can be also easily and quickly formed by bringing the end mill arranged in the axial direction into contact with the end portion 10A of the axial-hole member 10, followed by feeding the end mill in the axial direction.

In other words, the configuration of the key-engaging part 15 of the axial-hole member 10 in accordance with the present embodiment allows the more efficient fabrication of such a key-engaging part 15 of the axial-hole member 10, compared with the conventional one, resulting in a low machining cost.

Next, a method for connecting the axial-hole member 10 with the shaft 12 in the key-engaging part structure of the axial-hole member 10 will be described.

At first, the key 16 is engaged in a key way 12A of the shaft 12 in advance. Then, a combination of the key 16 and the shaft 12 approaches the axial hole 14 of the axial-hole member 10 so as to be co-axially aligned to each other, followed by co-axially fitting them into the hole 14.

More specifically, the key 16 is inserted through the insertion groove 22 and is then engaged in the through hole 20 for the engagement of the key formed in the axial-hole member 10.

Subsequently, the protrusions 24B, 24C of the stopper 24 come into contact with the groove 26 of the axial-hole member 10. Then, the stopper 24 is pushed toward the axial-hole member 10. Consequently, the protrusions 24B, 24C are guided into the groove 26 such that these protrusions 24B, 24C outwardly extended along the groove 26 in the opposite directions. Subsequently, the tip portions of the protrusions 24B, 24C extend across the both ends of a straight line segment passing through the center of the circle in cross section (i.e., the opposite radial ends of the groove 26), respectively. After that, the protrusions 24B, 24C come into close to each other by their constricting forces, so that the stopper 24 can be fit in the groove 26, while the protrusion 24A of the stopper 24 is inwardly inserted into the through hole 20 in the radial direction to contact with the key 16.

According to such a configuration, undesired disengagement of the key 16 outwardly in the radial direction can be prevented and the axial-hole member 10 and the shaft 12 can be connected to each other through the intervention of the key 16 to allow a power transmission.

In addition, the axial movement and inclination of the stopper 24 is restricted by the groove 26, so that the stopper 24 will be hardly slipped off by vibration or the like. The stopper 16 can be prevented from falling off with a high degree of reliability.

Figure 5:
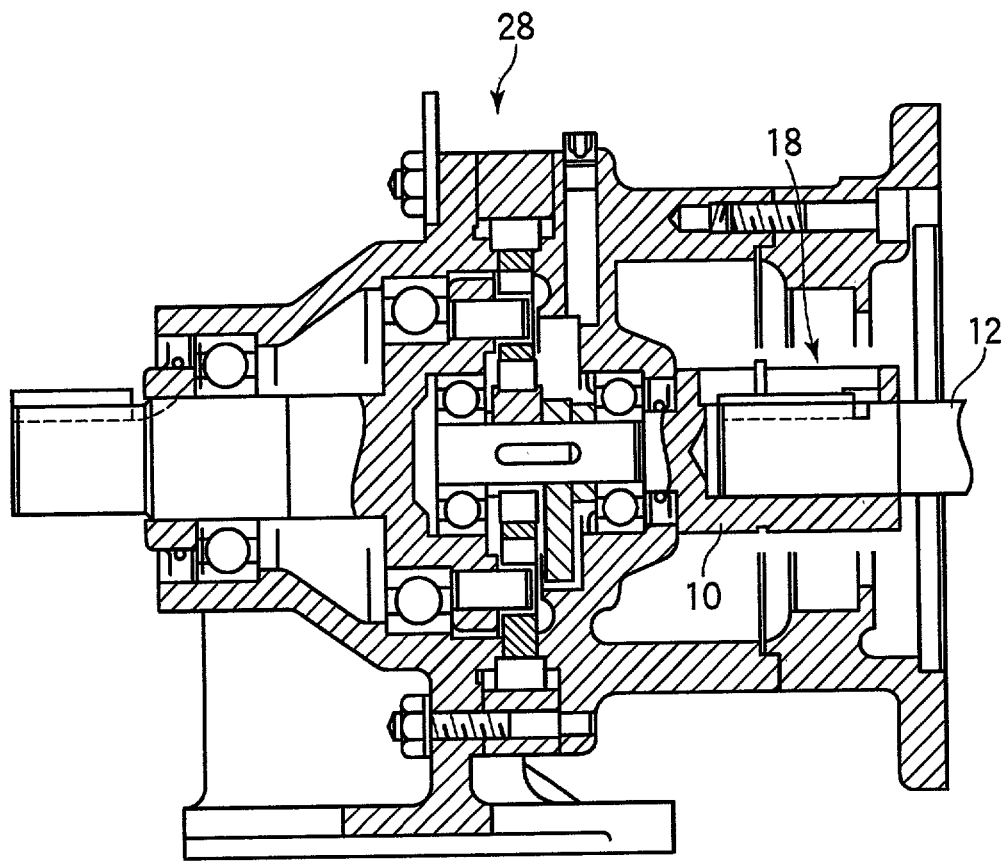
FIG. 5 is a cross sectional view illustrating an applied example of the key-engaging part structure of the axial-hole member on a reduction gear assembly.
Figure 6:
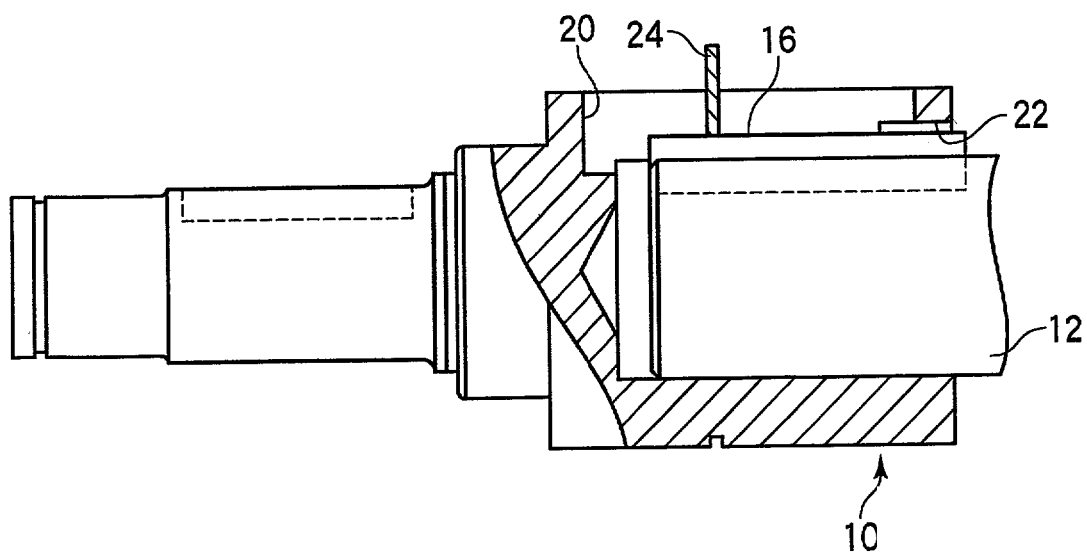
FIG. 6 is a cross sectional view of a key-engaging part of an axial-hole member in accordance with a second preferred embodiment of the present invention.

Referring now to FIG. 5, there is shown an example of the application of the key-engaging part structure of the axial-hole member to the connection between a reduction gear assembly and a motor. In this case, the axial-hole member 10 is integrally provided as an input shaft of the reduction gear assembly 28, while the shaft 12 is integrally provided as an output shaft of the motor.

Here, a key-engaging part structure of an axial-hole member in accordance with a second preferred embodiment of the present invention will be described.

As shown in FIG. 2, the key-engaging part structure of the axial-hole member in accordance with the present embodiment is constructed as in the case of the first embodiment, except of the follows. In this embodiment, that is, the key 16 extends in the axial direction such that the key 16 being inserted is allowed to approach or to come into contact with the insertion groove 22.

As the key-engaging part structure is constructed as described above, the insertion groove 22 in the inner peripheral portion of the axial part 10A can be used as a stopper for preventing the key 16 from outwardly falling down in the radial direction. In this case, an undesired disengagement of the key 16 can be prevented by the insertion groove 22 only, so that there is no need to provide the stopper 24. Therefore, it becomes possible to reduce the number of structural components and production expenses.

Next, a key-engaging part structure of an axial-hole member in accordance with a third preferred embodiment of the present invention will be described.

Figure 7:
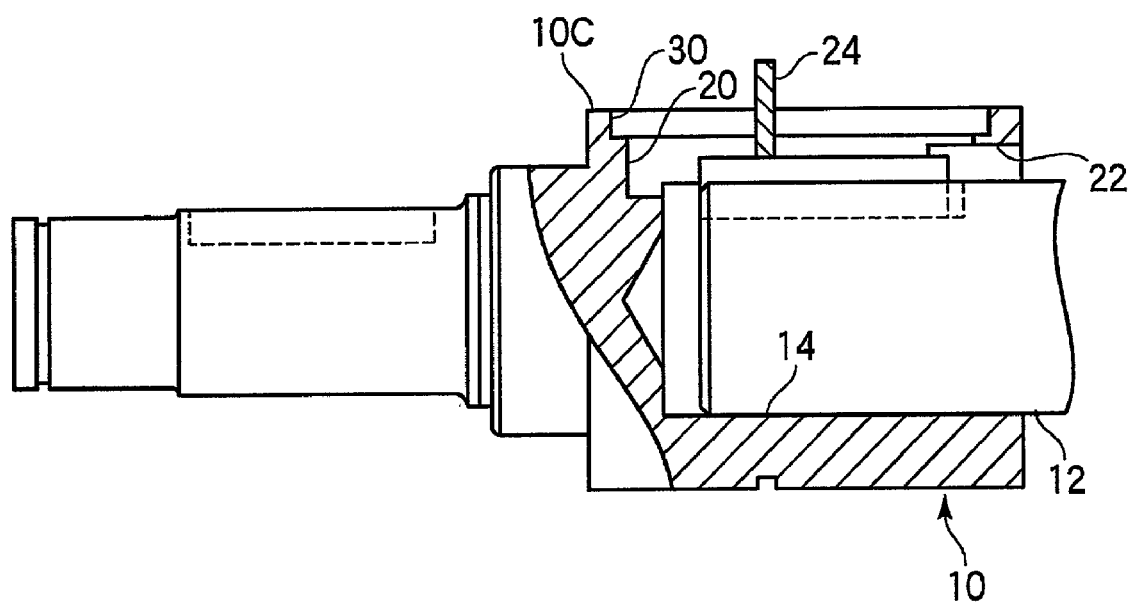
FIG. 7 is a cross sectional view of a key-engaging part of an axial-hole member in accordance with a third preferred embodiment of the present invention.
Figure 8:
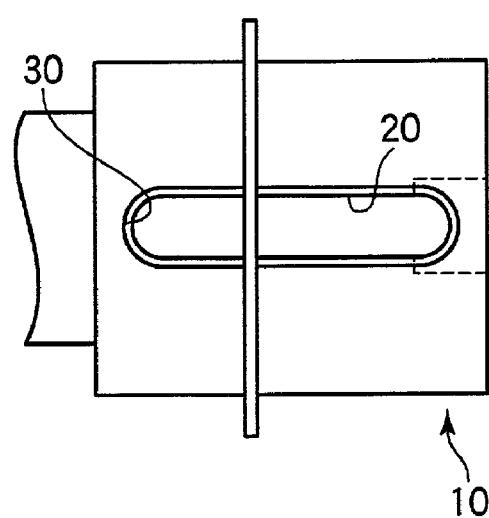
FIG. 8 is a plan view of the same key-engaging part as shown in FIG. 7.

In this embodiment, as shown in FIG. 7 and FIG. 8, the key-engaging part structure is constructed as with the first or second preferred embodiment except that a recess portion 30 is formed in the outer peripheral portion 10C of the axial-hole member 10 and a key-engaging through hole 20 is formed between the bottom of the recess portion 30 and the axial hole 14.

That is, the boundaries of the key-engaging through hole 20 are limited to the vicinity of the boundaries of the area to be contact with the key 16 near the axial hole 14.

Such a configuration of the key-engaging part structure allows the reduction in the amount of work on the key-engaging through hole 20 which requires a finishing step. Thus, the work efficiency can be improved.

In this embodiment, there is no need to precisely make the recess portion, so that it can be easily formed.

In each of the above first to third preferred embodiments, the insertion groove 22 is formed in the axial-hole member 10. According to the present invention, however, it is not limited to such a configuration. Alternatively, the axial-hole member may be fabricated without the formation of an insertion groove.

In this case, for example, the axial-hole member 10 and the shaft 12 can be connected to each other through the key 16 by inserting the key 16 from the outside of the key-engaging through hole 20 in the radial direction after fitting the shaft 12 into the axial hole 14 of the axial-hole member 10.

Alternatively, the shaft 12 may be fit in the axial hole 14 after fitting the key 16 in the key-engaging through hole 20 from the side of the axial hole 14.

In each of the above first to the third preferred embodiments, the axial hole 14 of the axial-hole member 10 has a closed end (on the output side) in the axial direction. According to the present invention, however, it is not limited to such a construction. The key-engaging part structure of the axial-hole member in accordance with the present invention can be also applied on the axial-hole member in which the axial hole is bored through the axial-hole member in the axial direction.

If the both ends of the axial hole are provided as opened ends, the key way (key-engaging part) can be effectively formed by inserting a broach into the axial hole. However, such a broach is too expensive, so that depreciation expense with a little production amount will be a problem.

In this case, the key-engaging part structure of the axial-hole member may be applied on the axial-hole member having the through axial hole so as to allow the production of the key-engaging part at low cost by means of end mill or the like without using the broach.

In each of the above first to third preferred embodiments, furthermore, the stopper 24 is provided as an E-shaped snap ring. According to the present invention, however, it is not limited to such a construction. Alternatively, for example, the stopper 24 may be provided as a C-shaped snap ring capable of approaching or coming into contact with the key that extends to the vicinity of the outer peripheral portion of the axial-hole member outward in the radial direction.

If the recess portion 30 is formed around the through hole 20, for example, the recess portion 30 may be used for accommodating a lid for preventing the key 16 from falling off in a predetermined space.

In the present invention, furthermore, the through hole may be used for the formation of key-engaging part at a position radially symmetrical with respect to the through hole.

Here, this fourth embodiment will be described with reference to the figures.

Figure 9:
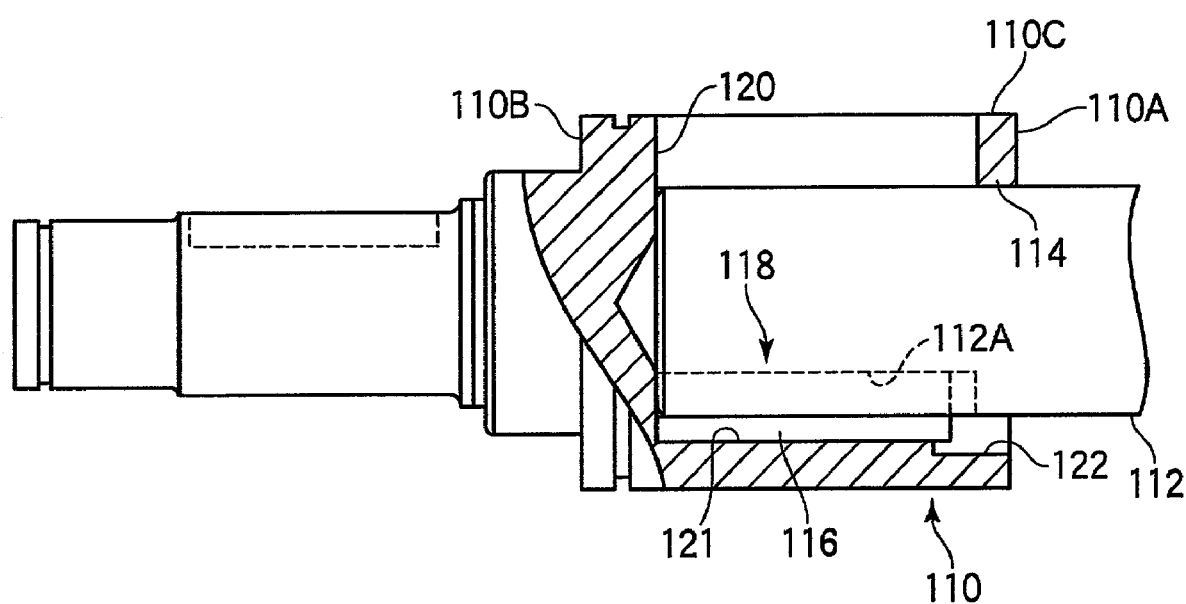
FIG. 9 is a cross sectional view of a key-engaging part of an axial-hole member in accordance with a fourth preferred embodiment of the present invention.

FIG. 9 is a cross sectional view of a key-engaging part 118 of an axial hole member along to the axial direction, in accordance with a preffered embodiment of the present invention.

Figure 10:
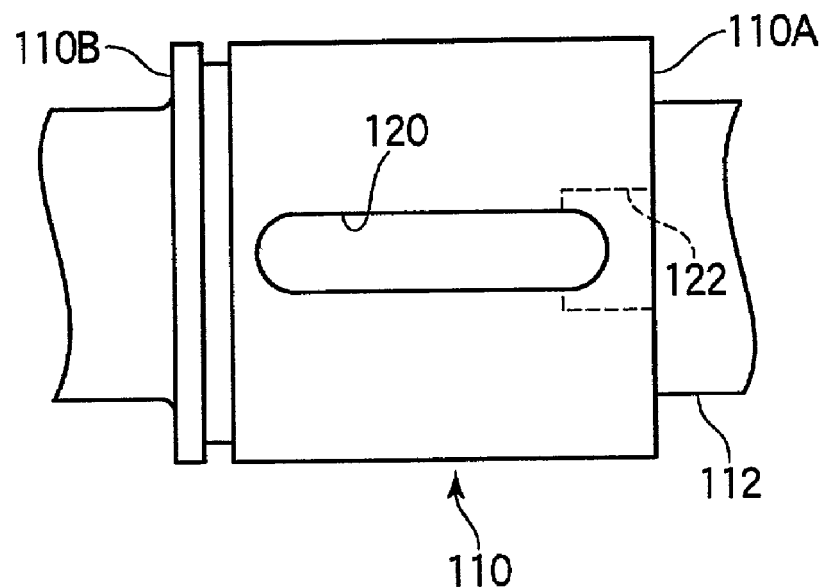
FIG. 10 is a plan view of the same key-engaging part as shown in FIG. 9.

FIG. 10 is a plan view of the same key-engaging part 118 as shown in FIG. 9.

Figure 11:
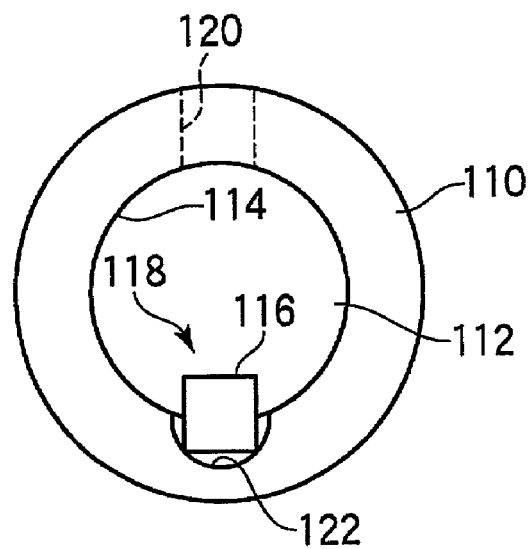
FIG. 11 is a side view of the same key-engaging part as shown in FIG. 9.

FIG. 11 is a right side view of the same key-engaging part 118 as shown in FIG. 9.

As shown in FIGS. 9 to 11, in a key-engaging part structure of an axial-hole member in accordance with the present embodiment, the axial-hole member 110 has the axial hole 114 to be fit to the shaft 112 to make connection with the shaft 112 through the key 116 engaged with the key-engaging part 118 formed in the inner peripheral side of the axial hole 114, allowing a power transmission between the axial-hole member 110 and the shaft 112.

The configuration of the key-engaging part structure of this embodiment, the axial-hole member 110 has a work hole (through hole) 120 bored from the outer peripheral portion 110C of the axial-hole member 110 to the axial hole 114 while the both ends 110A and 110B remain intact in the axial direction. A key way 121 (i.e., a key-engaging part 118) for the engagement of the key 116 is also formed in the axial-hole member 110 such that the key-engaging part 118 and the axial-hole member 110 are arranged on symmetric opposite sides of the axial-hole member 110 in the radial direction, respectively.

Also, an insertion groove 122 in the shape of an arc is formed in the inner peripheral side of an end portion 110A of the axial hole 114 in the axial direction. The insertion groove 122 allows the axial insertion of the key 116 into the axial hole 114.

In this embodiment, one end portion 110A of the axial hole 114 is provided as an opened end, while the other end portion 110B thereof is provided as a closed end.

Furthermore, the shaft 112 has a key way 112A just as in the case with the conventional one.

Now, the action of such a key-engaging part structure of the axial-hole member will be described.

At first, the method for forming the key way 121 to be used for the engagement of the key 116 will be described.

The key way 121 is formed by executing the procedures in which the work hole (through hole) 120 bored from the outer peripheral portion 110C to the axial hole 114 is formed in the axial-hole member 110 while both ends 110A and 110B are left intact in the axial direction and subsequently a cutting tool is inserted into the work hole 120 in the radial direction, followed by feeding the cutting tool in the axial direction.

More specifically, for example, an end mill is passed into the axial-hole member 110 from the outer peripheral portion 110C until the end mill reaches the axial hoe 114. Then, the end mill is fed in the axial direction. As a result, the work hole 120 can be formed. Subsequently, the end mill is inserted to the symmetric position opposite to the work hole 120 in the radial direction, followed by feeding the end mill in the axial direction. Thus, the key way 121, i.e., key-engaging part 118 can be easily and quickly formed.

Accordingly, the work efficiency of the fabrication of the key way can be significantly increased, compared with the conventional method for forming the key way using the slotter.

Furthermore, the insertion groove 122 can be also easily and quickly formed by bringing the end mill arranged in the axial direction into contact with the end portion 110A of the axial-hole member 110, followed by feeding the end mill in the axial direction.

In other words, the configuration of the key-engaging part of the axial-hole member in accordance with the present embodiment allows the more efficient fabrication of such a key-engaging part 15 of the axial-hole member 10, compared with the conventional one, resulting in a low machining cost.

Next, a method for connecting the axial-hole member 110 with the shaft 112 in the key-engaging part structure of the axial-hole member will be described.

At first, the key 116 is engaged in a key way 112A of the shaft 112 in advance. Then, a combination of the key 116 and the shaft 112 approaches the axial hole 114 of the axial-hole member 110 so as to be co-axially aligned to each other, followed by co-axially fitting them into the axial hole 114.

More specifically, the key 116 is inserted through the insertion groove 122 and is then engaged in the key way 121 formed in the axial-hole member 110.

Accordingly, the axial-hole member 110 and the shaft 112 can be connected to each other to allow a power transmission between the axial-hole member 110 and the shaft 112 via the key 116. In addition, the outer end of the key way 121 is closed in the radial direction, so that the key 116 can be stably held in the key way 121 without outwardly falling off in the radial direction.

Figure 12:
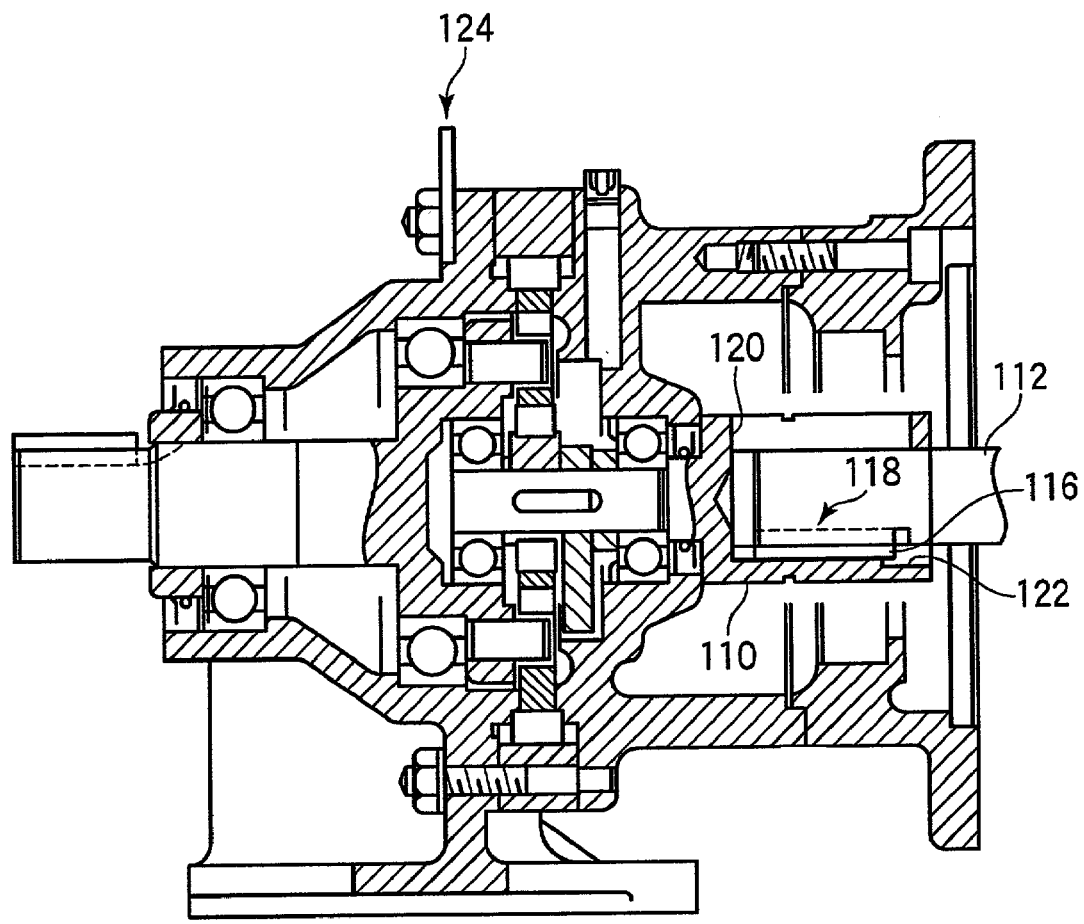
FIG. 12 is a cross sectional view illustrating an applied example of the key-engaging part structure of the axial-hole member on a reduction gear assembly.

Referring now to FIG. 12, there is shown an example of the application of the key-engaging part structure of the axial-hole member to the connection between a reduction gear assembly and a motor. In this case, the axial-hole member 110 is integrally provided with an input shaft of the reduction gear assembly 124, while the shaft 112 is integrally provided with an output shaft of the motor.

Next, we will describe a key-engaging part structure of an axial-hole member in accordance with a fifth preferred embodiment of the present invention.

Figure 13:
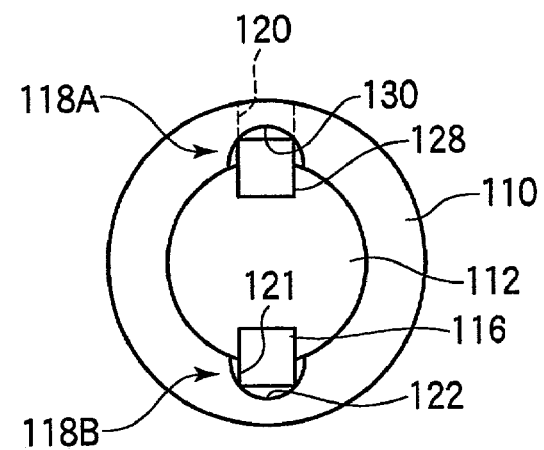
FIG. 13 is a cross sectional view of the key-engaging part of the axial-hole member in accordance with a fifth preferred embodiment of the present invention.
Figure 14:
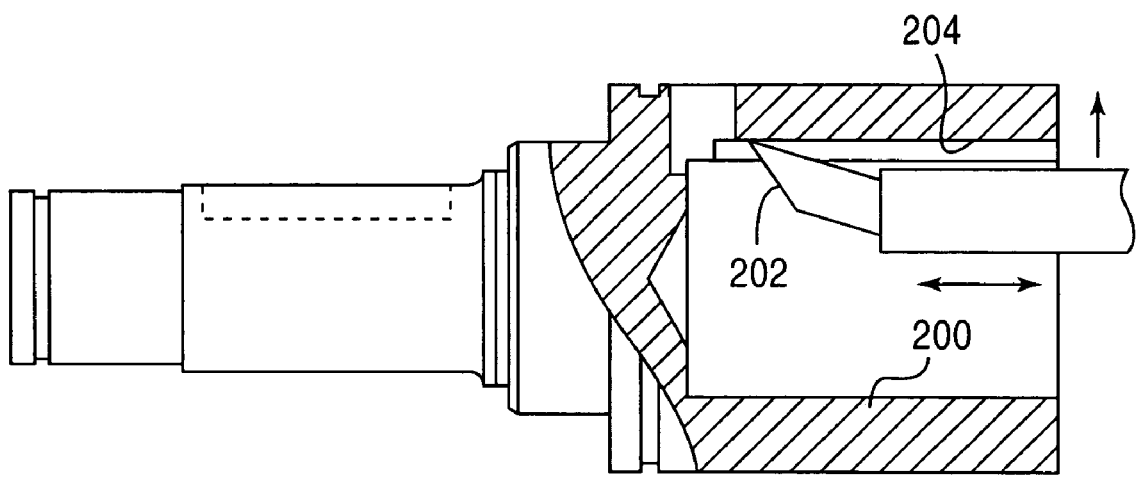
FIG. 14 is a cross sectional view of a key-engaging part of a conventional axial-hole member.

In this embodiment, as shown in FIG. 13, in contrast to the fourth preferred embodiment, there are two keys 116 and 128 which can be fit in the key-engaging part structure, respectively. That is, the first key 116 is allowed to engage with a key-engaging portion 118A in the work hole (through hole) 120, while the second key 128 is allowed to engage with another key-engaging portion 118B in the key way 120. In other words, the fifth embodiment can be considered as a combination of the first to third preferred embodiments with the fourth preferred embodiment.

In addition, there is an insertion groove 130 formed between the end portion 110A of the axial-hole member 110 and the work hole 120. Therefore, the key 128 can be inserted through the insertion groove 130.

Such a configuration of the key-engaging part structure is able to connect the shaft 112 with the axial-hole member 110 through two keys 116 and 128, so that the transmission capacity of rotary power can be increased.

In this case, for example, the same measures as those of the first to third preferred embodiments may be done for surely preventing the key 128 from falling off outwardly from the work hole 120 in the radial direction. Concretely, a lid for covering the work hole 120 may be provided, or a stopper with a snap-ring shape or the like to be fit to the axial-hole member 110 around the work hole 120 may be provided.

In the fourth preferred embodiment, the insertion groove 122 is formed in the axial-hole member 110. Alternatively, an axial-hole member without such an insertion groove 122 may be applied.

In this case, the axial-hole member 110 and the shaft 112 can be connected to each other through the key 116 by previously fitting the key 116 in the key way 121 from the side of the axial hole 114, and then fitting the shaft 112 in the axial hole 114.

In this case, however, there is the key way in the shape of a hole having closed opposite ends depending on the shaft member. If the key is fit in the key way in the axial-hole member in advance and such a shaft member and the axial-hole member are fit together, the shaft member and the key become interfered with each other. As a result, the shaft member and the axial-hole member cannot be connected to each other.

If the insertion groove 122 is provided for such a situation, the key can be fit to the shaft member side even though the key way having closed opposite ends is formed in the shaft member. As a result, the shaft member and the axial-hole member can be easily connected to each other as described above.

In other words, if the insertion groove 122 is formed, it becomes possible to easily connect between the shaft member and the axial-hole member without depending on the type of the shaft member.

Simultaneously, in the fifth preferred embodiment, the axial-hole member without the insertion groove 130 may be used. In this case, the axial-hole member 110 and the shaft 112 can be connected to each other through the key 128 by previously fitting the key 128 in the work hole 120 from the side of the axial hole 114.

Furthermore, the key 128 may be inserted and engaged from the outside of the work hole 120 in the radial direction after fitting the shaft 112 into the axial hole 114 of the axial-hole member 110.

Furthermore, in the fourth and fifth preferred embodiments, one end of each of the axial-hole member 110 and the axial hole 114 is being closed. According to the present invention, as described above, it is not limited to such a construction. The present invention can be applied on the axial-hole member where the axial hole is bored through the axial-hole member in the axial direction.

Moreover, in the fourth preferred embodiment, the illustrative method for forming the key way 121 includes the steps of forming the work hole 120 using an end mill and further forming the key way 121 using the end mill. According to the present invention, however, it is not limited to such a method. Alternatively, for example, the method may include the steps of passing a cutting tool such as an end mill through the axial-hole member 110 from the outer peripheral portion 110C to the axial hole 114 and subsequently feeding the cutting tool into a symmetric position in the radial direction, followed by feeding the cutting tool in the axial direction. This kind of the processing method may be common to the previously mentioned method in that the step of forming the work hole (through hole) 120 and the step of forming the key way (key-engaging part) 121 are simultaneously performed (i.e., the key-engaging part is formed using the through hole).

Such a configuration of the key-engaging part structure allows the improvement in the work efficiency of the key-engaging part of the axial-hole member.

At this time, if an end-mill like tool in the shape of a staged shaft having an outer diameter portion for key way formation and a larger outer diameter portion for work-hole formation is used in the formation of the key way, the key way can be stably formed as the rigidity of the tool increases.

In summary, as described above, the present invention has excellent advantages in that the key-engaging part can be efficiently formed in the axial-hole member, compared with the conventional one.

The key-engaging through hole has closed opposite ends in the axial direction while being bored through the axial-hole member from the outer peripheral portion to the inner peripheral portion in the radial direction. Therefore, even if a rotary power acts on the axial-hole member, it is hard to propagate along the circumferential direction.

Therefore, a large rotary power can be transmitted as much as or more than that of the conventional key way in which the outer radial end thereof is being closed.

While there has been described what are at present considered to be preferred embodiments of the invention, it will be understood that various modifications may be made thereto, and it is intended that the appended claims cover all such modification as fall within the true spirit and scope of the invention.

What is claimed is:

1. A key-engaging part structure of an axial-hole member, having an axial hole fit to a shaft, where the key-engaging part structure is connected to the shaft in a power transmittable manner via a key engaged with the key-engaging part structure formed on an inner peripheral portion of the axial-hole member, wherein a through hole is formed in the axial-hole member such that the through hole extends from the outer peripheral portion of the axial-hole member to the axial hole, wherein the through hole is longer in an axial direction than a radial direction of the axial hole member, leaving both axial end portions of the axial-hole member intact, a key way is formed on an inner periphery of the axial-hole member at a position symmetrical with the through hole in the radial direction, wherein the key and the shaft are assembled into the axial-hole member, such that the shaft is co-axially aligned to the axial hole member, and wherein the key transmits rotational power between the key-engaging part and the shaft, and wherein a longitudinal direction of the key and the keyway is the same direction as an axial direction of the axial-hole member wherein an insertion groove is formed in the inner peripheral portion of a part of the axial hole in an axial direction so as to allow the insertion of the key in the axial direction.

2. The key-engaging part structure of an axial-hole member according to claim 1, wherein said key-engaging part structure is formed in the axial-hole member independently at said position symmetrical with the through hole.

3. The key-engaging part structure of an axial-hole member according to claim 1, wherein said key way is located on the inner periphery of axial-hole member opposite said through hole.

* * * * *